United States Patent

[11] 3,584,895

| [72] | Inventors | Hitoshi Uemura<br>Yokohama;<br>Yuichiro Motomura, Tokyo, both of, Japan |
|---|---|---|
| [21] | Appl. No. | 864,465 |
| [22] | Filed | Oct. 7, 1969 |
| [45] | Patented | June 15, 1971 |
| [73] | Assignee | Nissan Motor Company Limited<br>Kanagawa-ku, Yokohama, Japan |

[54] AUTOMOTIVE SUSPENSION MECHANISM
10 Claims, 9 Drawing Figs.

| [52] | U.S. Cl. | 280/124,<br>267/20 |
|---|---|---|
| [51] | Int. Cl. | B60g 9/02 |
| [50] | Field of Search | 280/124,<br>124.1, 106; 267/20, 18 |

[56] References Cited
UNITED STATES PATENTS

| 2,113,403 | 4/1938 | Harmon | 280/106 |
| 2,502,744 | 4/1950 | Parker | 280/124 |
| 2,996,311 | 8/1961 | Thiry | 280/124 |

Primary Examiner—Milton Buchler
Assistant Examiner—Carl A. Rutledge
Attorney—McCarthy, Depaoli, O'Brien & Price ABSTRACT: An independent suspension mechanism for automotive vehicles having a pair of suspension arms which are pivotally connected with the structural members of the vehicle body by means of specially constructed support member. The support member may include a rigid or, preferably, resilient bushing providing a sufficient amount of prestress in the axial and radial directions of the pivot shaft of the suspension arm. The support member may be connected to the structural member or members through a brace which is substantially resilient in the direction of the pivot shaft.

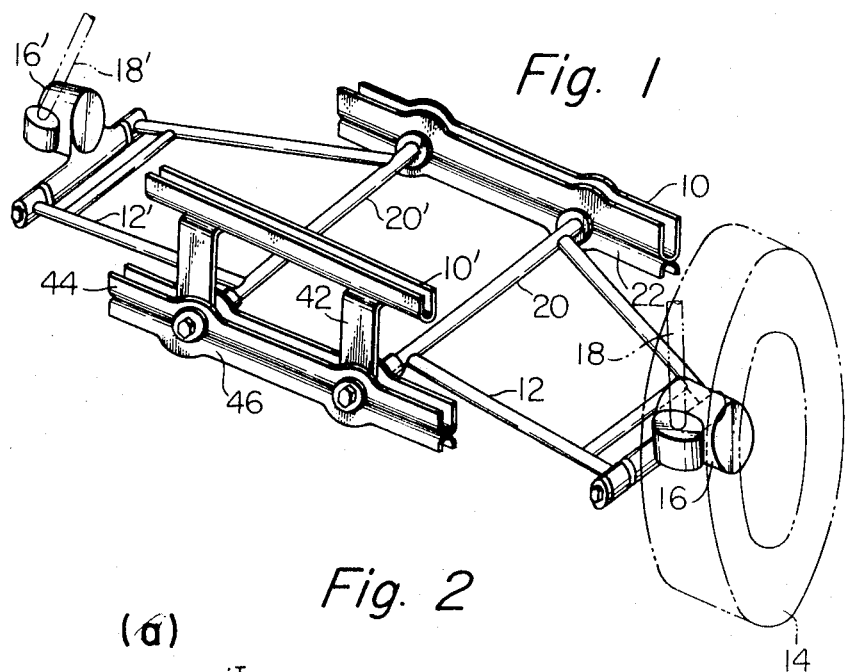
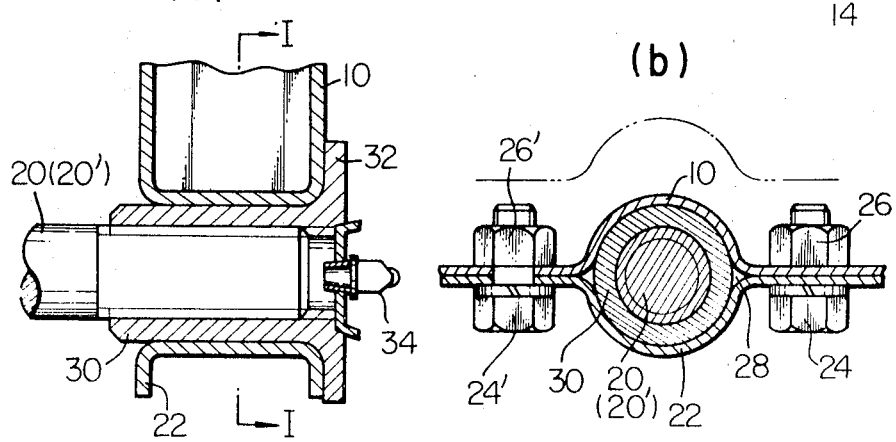
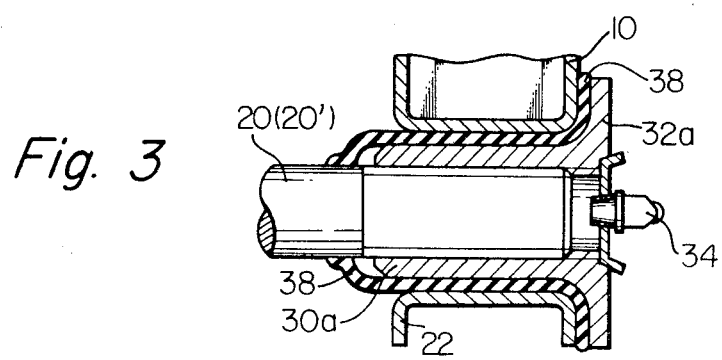

AUTOMOTIVE SUSPENSION MECHANISM

This invention relates to a suspension mechanism of a motor vehicle and, more particularly, to an independent suspension mechanism using a pair of suspension arms by means of which the vehicle wheels, front or rear, are connected to the vehicle body with the aid of a spring member connected to each of the arms.

The suspension arm connecting the front or rear vehicle wheel to the vehicle body, as heretofore constructed and practiced, is mounted on the vehicle body through a specially designed, disproportionately large-sized frame or suspension member connected with the vehicle body. It is thus the ordinary practice not to have the suspension arms carried directly by the vehicle body, or more precisely, by structural members forming part of the vehicle body. This is, at least in part, because the wheel alignment tolerance (which usually is of the order of ±0.5 mm.) can not be dictated by the vehicle body tolerance (which usually is of the order of ±3 mm.), as is well known.

The use of such large-sized frame or suspension member necessarily results in an increased weight and intricate construction of the suspension system in its entirety, adding to the production cost and impairing the performance quality of the motor vehicle incorporating such a suspension mechanism.

It is, therefore, an object of this invention to provide an independent suspension mechanism which is simple and economical to manufacture.

It is another object of the invention to provide an independent suspension mechanism which can be mounted on the vehicle body without use of any large-sized intricate member.

It is another object of the invention to provide an independent suspension mechanism which is mounted directly on the vehicle body without sacrificing the wheel alignment accuracy.

It is another object of the invention to provide an independent suspension mechanism capable of effectively absorbing the shocks transferred from the wheels.

It is still another object of the invention to provide an independent suspension mechanism in which the dimensional errors, if any, in the structural members by which the suspension arms are to be carried can be eliminated in a simple and economical manner when the suspension arms are assembled.

The independent suspension mechanism as proposed by this invention to accomplish these objects uses a pair of suspension arms each having a pivot shaft pivotally supported at each end by a suitable structural member of the vehicle body and a bracket rigidly secured to the structural member. The pivotal shaft is, in this instance, supported through two opposite semicircular recesses which are formed in the structural member and bracket. The term "structural member" as used in this specification and claims should be understood either as forming part of or as a member integral with the body structure of the vehicle on which the suspension is to be mounted.

Other objects, and advantages, of the independent suspension mechanism according to this invention will be more apparent from the following description taken in association with the accompanying drawings wherein like numerals are assigned to corresponding parts in all the figures and wherein:

FIG. 1 is a perspective view showing the essential construction arrangement of the independent suspension mechanism according to the invention;

FIG. 2a is a sectional view showing, on an enlarged scale, a preferred example of the front joint connection of the pivot shaft of the suspension arm, the section being taken axially of the suspension arm;

FIG. 2b is a section on line I–I of FIG. 2a;

FIG. 3 is similar to FIG. 2a but shows another preferred example of the front joint connection of the pivot shaft of the suspension arm;

Figure 4:
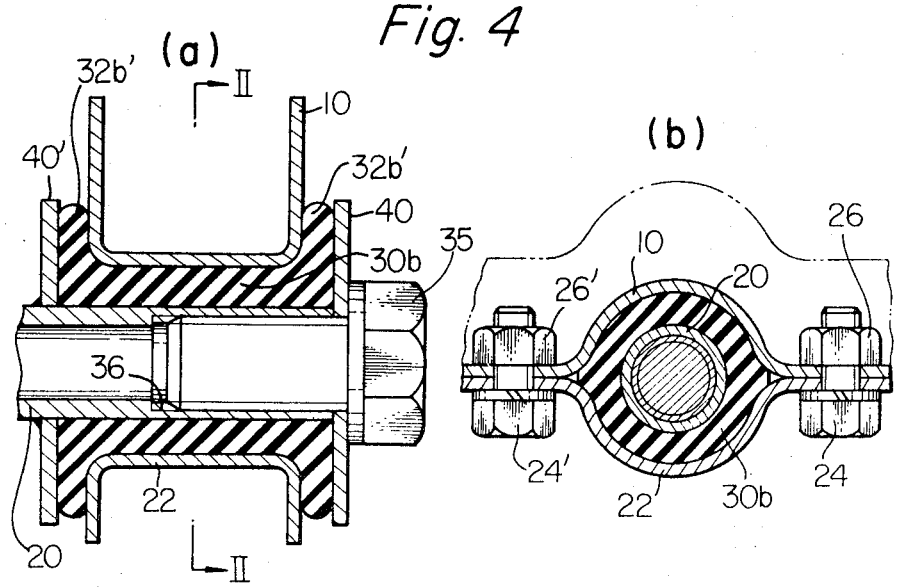
FIGS. 4a and 4b are similar to FIGS. 2a and 2b, respectively, but show a further preferred example of the front joint connection of the pivot shaft of the suspension arm.

It should be noted before entering into the detailed discussion of the invention that, although the independent suspension mechanism according to the invention is herein described and shown as mounted on the rear wheels, the same may be mounted on the front wheels, if desired.

Reference is first had to FIG. 1, which illustrates the overall construction arrangement of an independent suspension mechanism for an automotive vehicle of this invention.

As shown, the suspension mechanism is carried by front and rear structural members 10 and 10', respectively, of the vehicle body. These structural members 10 and 10' may be either part of the vehicle body or independent reinforcement members rigidly secured to the vehicle body, as previously noted. A pair of suspension arms to which this invention is essentially directed are indicated by 12 and 12'. The suspension arm 12 (or 12') per se is of known construction and function and is operatively connected, as customary, with the wheels 14 through hubs 16 and 16' and struts 18 and 18', respectively. The suspension arms 12 and 12' are connected to the structural members 10 and 10' through their pivot shafts 20 and 20', respectively.

According to the invention, the pivot shafts 20 and 20' are pivotally connected to the front structural member 10 with the aid of a bracket 22. The structural member 10 and bracket 22 are herein shown as U-shaped in section, though they may be configured otherwise.

Both the structural member 10 and bracket 22 have formed therein a pair of semicircular recesses defined by the facing walls of the structural member and bracket, as seen in FIG. 2a and 2b. The structural member 10 and the bracket 22 are fastened together by suitable fastening means such as bolts 24 and 24' and nuts 26 and 26', as seen in FIG. 2b. The result is that there are formed a pair of generally circular opening 28 by the pair of recesses in the structural member 10 and bracket 22. The diameter of the opening 28 is such that it admits free passage of the pivot shaft 20 or 20' therethrough. The pivot shaft 20 (or 20') is threaded at its leading end and screwed into the hole of a bushing 30 having a flange portion 32. The outside diameter of the bushing 30 is such that the opening 28 in the structural member 10 and bracket 22 closely receives the bushing 30. The bushing 30 thus fitted to the pivot shaft 20 is secured to the structural member 10 and bracket 22 through the opening 28 by means of suitable fastening means 34. The flange portion 32 of the bushing 30 abuts against the outside wall of the structural member 10 and bracket 22 and bears a thrust in the axial direction of the shaft 20.

The bushing 30 may be made of resilient material such as rubber so that it provides a prestress exercised axially and radially of the pivot shaft 20. Or otherwise, the bushing 30 may be made of solid material and, if preferred, it may be covered with a resilient bushing on its outer periphery, an example being shown in FIG. 3.

As seen in FIG. 3, the bushing 30a having a flange 32a and made of solid material such as steel is threaded on its outer periphery. The outside diameter of the bushing 30a is smaller than the diameter of the opening 28. A resilient member 38 is interposed between the outer periphery of the bushing 30a and the walls of the structural member 10 and bracket 22 defining the opening 28. The bushing 30a being threaded on its outer periphery, the same is securely captured by the resilient member 38, which, in turn, is also securely fitted into the opening 28.

In order to have available an increased prestress in the axial direction of the pivot shaft, the bushing may be provided with two flanges seizing the structural member 10 and bracket 22 tightly. An example of such construction of the bushing is illustrated in FIGS. 4a and 4b, the latter being a section on line II–II of the former.

As shown, the bushing 30b, which is this time shown as made of resilient material, has a pair of flange portions 32b and 32b' which are fitted against the sidewalls of the structural member 10 and bracket 22. To the outside walls of the flange portions 32b and 32b' are attached a pair of flange plates 40 and 40' by a bolt 35 and nut 36.

The front joint connection of the pivot shaft thus constructed and arranged works in close cooperation with the rear joint connection of the pivot shaft, as will be discussed in the following.

Reverting to FIG. 1, the pivot shafts 20 and 20' are also pivotally connected to the rear structural member 10' through a brace 42, flanged support 44 and bracket 46. A preferred example of the connections of these members is illustrated in FIG. 5.

Figure 5:
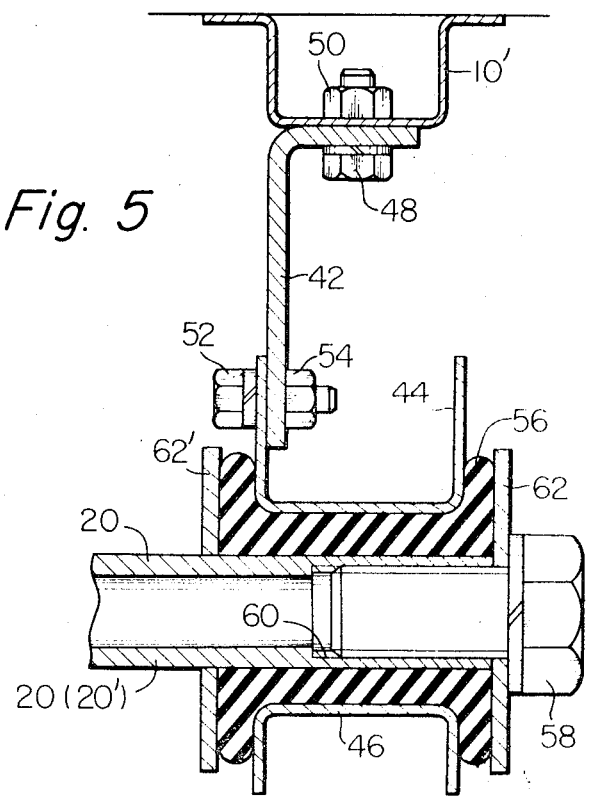
FIG. 5 is a sectional view showing, on an enlarged scale, the rear joint connection of the pivot shaft of the suspension arm, the section being taken axially of the suspension arm.

Referring to FIG. 5, the brace 42 of L-shaped section is secured on one side thereof to the rear structural member 10' by a bolt 48 and nut 50 and on the other to the flanged support 44 by a bolt 52 and nut 54 in such a manner that the support 44 depends from the structural member 10'.

The flanged support 44 and bracket 46 have formed therein a pair of semicircular recesses defined by the facing walls of the structural member and bracket, though not illustrated in section. These recesses form, when the support 44 and bracket 46 are fastened together, a pair of generally circular openings which are analogous to the openings 28 and 28' formed in the front joint connection of the pivot shaft shown in the preceding Figures. Also similarly to the front joint connection previously described, the pivot shaft 20 (or 20') is securely received at its foremost end by a flanged bushing 56 which is shown to be made of resilient material. The resilient flanged bushing 56 is tightly fitted into the circular opening (not identified) defined by the facing walls of the support 44 and bracket 46 by means of a bolt 58 and nut 60. To both sides of the bushing 56 are attached a pair of flange plates 62 and 62', the flange plate 62 being intervened between the bolt 58 and the sidewall of the bushing 56.

The provision of the brace 42 in this example is important, because it permits of a substantial displacement of the pivot shaft 20 (or 20') in a direction at a right angle to the structural members 10 and 10' when in the assembly of the suspension system. Thus, the brace 42 serves to absorb a dimensional error, if any, in the suspension arm 12 to provide a desired alignment accuracy.

Figure 6:
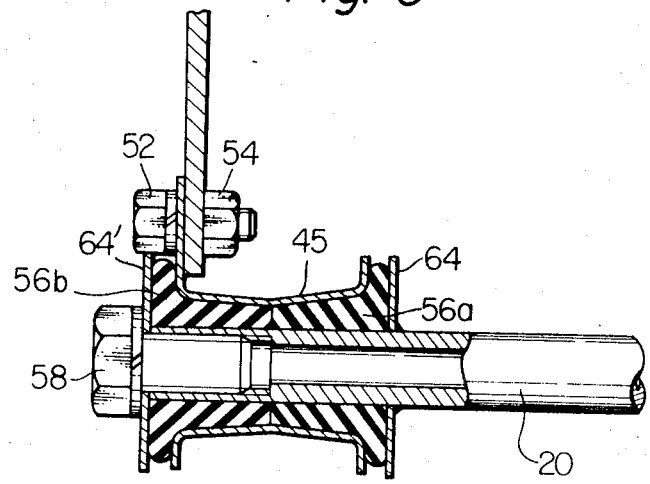
FIGS. 6 and 7 are similar to FIG. 5 but show other preferred examples of the rear joint connection of the pivot shaft of the suspension arm.

In order to facilitate the insertion of the bushing into the opening formed between the support 44 and bracket 46, the bushing may be divided into two halves 56a and 56b as shown in FIG. 6. In this instance the halves 56a and 56b are snugly fitted into the bore of a unitary flanged, generally cylindrical support 45 carried by the brace 42. To the outer walls of the halves 56a and 56b are attached a pair of flange plates 64 and 64', similarly to the example shown in FIG. 5.

Figure 7:
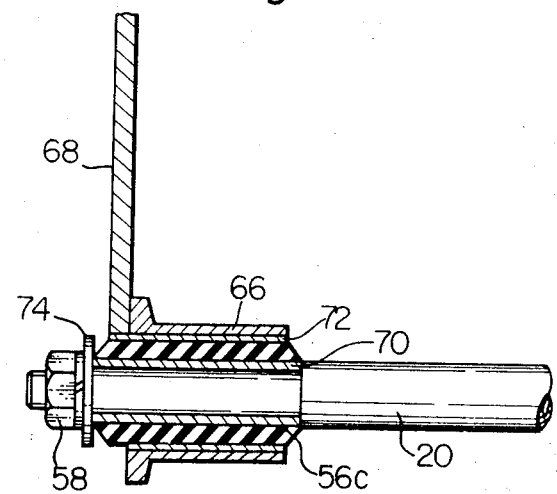

FIG. 7 illustrates a further modified form of the rear joint connection of the pivot shaft. As shown, a flanged support 66 is carried by a brace 68 which, in turn, is carried by the rear structural member 10'. The pivot shaft 20 is carried by this flanged support 66 through an inner protector sleeve 70, bushing 56c and outer protector sleeve 72. More specifically, the pivot shaft 20 is inserted at its leading end portion into the inner protector sleeve 68, which, in turn, is inserted into the bushing 56c. The bushing 56c complete with the pivot shaft 20 and inner protector sleeve 70 is further inserted into the outer protector sleeve 72. The sleeve 72 is in turn inserted into the flange sleeve 66. The bushing 56c is herein illustrated as a rubber bushing, by way of example. The pivot shaft 20 is threaded at its leading end and is secured in position by a bolt 58 through a flange plate 74. The inner and outer protector sleeves 70 and 72 lend themselves to protecting the bushing 56c from seizure.

According to one important phase of this invention, as is apparent from the foregoing description, the suspension arms can be mounted on the vehicle body without use of any large-sized intricate member such as a frame structure or a so-called suspension member. Thus, the suspension mechanism according to this invention will prove useful in reducing the overall vehicle weight and in improving the performance quality of the suspension. The suspension mechanism will also offer significant reduction in the production cost and ease of assembly work for its simple construction.

According to another important phase of the suspension mechanism of this invention, the suspension arm, or more precisely the pivot shaft thereof, can be mounted on the vehicle body with satisfactory accuracy even if a dimensional error is present between the front and rear structural members of the vehicle body. This is ascribed to the fact that the error possibly present between the front and rear structural members can be nullified by the displacement of the brace connecting the front structural member and the leading end of the pivot shaft.

According to still another important phase of the suspension mechanism of this invention, the bushing mounted on the end portions of the pivot shaft provide a sufficient amount of prestress in the axial and radial directions of the pivot shaft, which is, as the consequence, sufficiently securely carried by the structural members of the vehicle body. The amount of prestress will be increased if the bushings are made of resilient material. Where such rubber bushings are used, moreover, production of noise otherwise resulting from the operation of the suspension mechanism can be reduced to a minimum.

What I claim is:

1. An independent suspension mechanism for an automotive vehicle, including a pair of suspension arms each having a pivot shaft pivotally supported at each end by a structural member of the vehicle body and a bracket rigidly secured to said structural member, said pivot shaft being supported through two opposite semicircular recesses formed in the facing walls of said structural member and said bracket.

2. A mechanism according to claim 1, wherein a bushing is interposed between said pivot shaft and the peripheral edge of said semicircular recesses.

3. A mechanism according to claim 2, wherein said bushing is formed of a rigid material, to which is screwed the end portion of said shaft.

4. A mechanism according to claim 3, wherein a resilient bushing is interposed between the rigid bushing and the peripheral edge of said semicircular recesses.

5. A mechanism according to claim 2, wherein said bushing is formed of resilient material.

6. A mechanism according to claim 2, wherein said bushing is flanged on at least one side thereof for engagement with said structural member.

7. A mechanism according to claim 6, wherein said bushing is secured in position by means of a rigid flange attached to the outer side of the flange formed on the side of said bushing, said rigid flange being forced against the flange of the bushing by a bolt screwed into the end portion of said shaft.

8. A mechanism according to claim 2, wherein said bushing is carried by said structural member through a brace rigidly connected with said structural member and at the other with a support carrying said bushing therein.

9. A mechanism according to claim 8, wherein said bushing is split into two halves laterally and centrally thereof.

10. A mechanism according to claim 8, wherein inner and outer protector sleeves are interposed between said pivot shaft and said bushing and between the bushing and said support.